(12) United States Patent
Zhong et al.

(10) Patent No.: US 12,534,302 B2
(45) Date of Patent: Jan. 27, 2026

(54) MULTI-LAYER CONVEYING SYSTEM

(71) Applicant: GUANGZHOU MINO EQUIPMENT CO., LTD., Guangdong (CN)

(72) Inventors: Longyu Zhong, Guangdong (CN); Kaidong Huang, Guangdong (CN); Bangchao Qiu, Guangdong (CN); Qing Li, Guangdong (CN); Meng Yang, Guangdong (CN)

(73) Assignee: GUANGZHOU MINO EQUIPMENT CO., LTD., Guangdong (CN)

( * ) Notice: Subject to any disclaimer, the term of this patent is extended or adjusted under 35 U.S.C. 154(b) by 99 days.

(21) Appl. No.: 18/702,647

(22) PCT Filed: Apr. 28, 2022

(86) PCT No.: PCT/CN2022/089855
§ 371 (c)(1),
(2) Date: Apr. 18, 2024

(87) PCT Pub. No.: WO2023/065631
PCT Pub. Date: Apr. 27, 2023

(65) Prior Publication Data
US 2024/0409321 A1 Dec. 12, 2024

(30) Foreign Application Priority Data
Oct. 18, 2021 (CN) .......................... 202111211840.9

(51) Int. Cl.
*B65G 35/06* (2006.01)
*B66F 7/28* (2006.01)

(52) U.S. Cl.
CPC ................ *B65G 35/06* (2013.01); *B66F 7/28* (2013.01)

(58) Field of Classification Search
None
See application file for complete search history.

(56) References Cited

U.S. PATENT DOCUMENTS

| | | | |
|---|---|---|---|
| 6,655,297 B2 * | 12/2003 | Kawato | ...................... B61J 1/06 104/96 |
| 7,296,521 B2 * | 11/2007 | Kawato | ..................... B61B 3/00 104/103 |
| 10,472,180 B2 * | 11/2019 | Li | .......................... B65G 43/00 |

(Continued)

FOREIGN PATENT DOCUMENTS

| | | |
|---|---|---|
| CN | 205169663 U | 4/2016 |
| CN | 105692104 A | 6/2016 |

(Continued)

OTHER PUBLICATIONS

International Search Report and Written Opinion issued in PCT/CN2022/089855, dated Jul. 21, 2022, with English translation, 12 pages provided.

*Primary Examiner* — Kavel Singh
(74) *Attorney, Agent, or Firm* — HSML P.C.

(57) ABSTRACT

A multi-layer conveying system, comprising a trolley, two lifting devices and a multi-layer working assembly, wherein the multi-layer working assembly comprises a plurality of working stations; and each working station comprises a first guide rail assembly, a first driving assembly, a lateral positioning assembly, a vertical direction positioning assembly, and a conveying direction positioning assembly.

15 Claims, 10 Drawing Sheets

(56) References Cited

U.S. PATENT DOCUMENTS 10,604,351 B2 * 3/2020 Takahara ............ H01L 21/6773
12,145,806 B2 * 11/2024 Yang ...................... B65G 35/06

FOREIGN PATENT DOCUMENTS

| | | |
|---|---|---|
| CN | 205471285 U | 8/2016 |
| CN | 113879791 A | 1/2022 |
| JP | H02279238 A | 11/1990 |
| JP | H06127617 A | 5/1994 |
| JP | 2010235246 A | 10/2010 |

* cited by examiner

MULTI-LAYER CONVEYING SYSTEM

CROSS-REFERENCE TO RELATED APPLICATIONS

This application is an U.S. national phase application under 35 U.S.C. § 371 based upon international patent application No. PCT/CN2022/089855 filed on Apr. 28, 2022, which itself claims priority to Chinese patent application No. 202111211840.9, filed on Oct. 18, 2021. The contents of the above identified applications are hereby incorporated herein in their entireties by reference.

TECHNICAL FIELD

The present disclosure relates to the field of industrial conveying technologies, and in particular, to a multi-layer conveying system.

BACKGROUND

A flexible production mode with high efficiency and high flexibility is widely used in advanced automobile manufacturing workshops of domestic and foreign enterprises, which achieves a purpose of product diversification and also ensures economies of scale in automobile production. A trolley lifting and conveying system is such a flexible system, which may perform a welding operation on a workpiece at a working station where the workpiece is conveyed. In this process, there is a need to meet requirements such as a fast conveyor line speed, smooth lifting of a lift, high positioning accuracy, structural compactness, and an accelerated conveying beat. However, a current conveying system generally has problems such as slow operation, incapability to achieve high-beat production, easy deviation of a trolley during conveying, low positioning accuracy, and incapability to convey heavy workpieces.

SUMMARY

An objective of the present disclosure is to provide a multi-layer conveying system capable of high-speed conveying and high positioning accuracy to solve at least one of the technical problems existing in the prior art.

According to various embodiments of the present disclosure, a multi-layer conveying system is provided, including: at least two layers of working assembly, the working assembly including at least one working station, the working station including a first guide rail assembly and a first driving assembly: a trolley slidably connected to the first guide rail assembly, the first driving assembly being configured to drive the trolley to move along the first guide rail assembly for conveying; and lifting devices, each of the lifting devices being provided at an end of the working assembly, the lifting devices being configured to lift or lower the trolley, such that the trolley moves up and down between the layers of the working assembly: wherein the working station further includes a lateral positioning assembly, a vertical direction positioning assembly, and a conveying direction positioning assembly that are provided at predetermined positions on a conveying path of the trolley, the lateral positioning assembly being configured to contact and position the trolley from both sides thereof, the vertical direction positioning assembly being configured to contact and position the trolley in a vertical direction thereof, and the conveying direction positioning assembly being configured to selectively block the trolley from moving.

The above multi-layer conveying system has at least the following beneficial effects. The trolley is lifted and conveyed by the lifting devices, such that the trolley corresponds to a position of one layer of the working assembly. The first driving assembly drives the trolley to move in a horizontal direction. Workpieces are conveyed by the trolley. The trolley is roughly guided by the first guide rail assembly. As such, accuracy requirements of the entire system can be reduced, and low-cost and high-speed conveying can be achieved. By the lateral positioning assembly, the vertical direction positioning assembly, and the conveying direction positioning assembly, the trolley is accurately positioned at a predetermined position in which positioning is required. Two sides of the trolley, the height position of the trolley in the vertical direction, and the position of the trolley in a conveying direction are respectively positioned, such that the trolley accurately stops at the predetermined position.

In an embodiment, the conveying direction positioning assembly includes a first positioning member and a clamping component, the first positioning member being provided on the trolley, the clamping component being provided at a predetermined position on the conveying path of the trolley, the clamping component including a stopper and a pressing block capable of clamping relative to each other, the stopper being configured to block the first positioning member, and the pressing block being configured to compress the first positioning member, such that the first positioning member is in contact with the stopper.

In an embodiment, the clamping component further includes a bracket and a second driving assembly, the stopper and the pressing block are respectively rotatably connected to the bracket, the second driving assembly including a first connecting rod, a second connecting rod, and a second driving member, the first connecting rod being rotatably connected to the stopper, one end of the second connecting rod being rotatably connected to the first connecting rod, the other end of the second connecting rod being rotatably connected to the bracket, the second driving member being configured to drive the second connecting rod to rotate, and the first connecting rod and the second connecting rod having a first position state on the same straight line, and in the first position state, the stopper contacts and blocks the first positioning member.

In an embodiment, the second driving member is a cylinder, a piston rod of the second driving member is rotatably connected to the second connecting rod, a cylinder block of the second driving member is rotatably connected to the bracket, the clamping component further includes a third driving member configured to drive the pressing block to rotate, the third driving member being a cylinder, a piston rod of the third driving member is rotatably connected to the pressing block, and a cylinder block of the third driving member is rotatably connected to the bracket. Certainly, the second driving member and the third driving member may alternatively be hydraulic cylinders or electric push rods, which are not limited herein.

In an embodiment, the vertical direction positioning assembly includes a first positioning wheel and a first positioning block, one of the first positioning wheel and the first positioning block being provided at the bottom of the trolley, the other of the first positioning wheel and the first positioning block being fixedly provided at a predetermined position on the conveying path of the trolley, and at the predetermined position, the first positioning wheel is in contact and cooperates with the first positioning block to enable the trolley to climb to a predetermined height.

In an embodiment, the lateral positioning assembly includes a second positioning wheel and a second positioning block, one of the second positioning wheel and the second positioning block being provided on a side face of the trolley, the other of the second positioning wheel and the second positioning block being fixedly provided at a predetermined position on the conveying path of the trolley, and at the predetermined position, the second positioning wheel is in contact and cooperates with the second positioning block.

In an embodiment, the first driving assembly includes a friction driving mechanism and a friction rod, the friction rod being fixedly connected to the trolley, the friction driving mechanism including a driving wheel, a driven wheel, a driving side swing arm, a driven side swing arm, and a base, the driving side swing arm and the driven side swing arm being respectively and rotatably connected to the base on a same axis, the driving wheel being rotatably provided on the driving side swing arm, the driven wheel being rotatably provided on the driven side swing arm, the driving wheel and the driven wheel clamping the friction rod to form contact friction, an elastic member is provided between the driving side swing arm and the driven side swing arm, the elastic member being configured to provide a pre-tightening force to enable the driving wheel and the driven wheel to clamp the friction rod, and rotation of the driving wheel is capable of driving the friction rod and the trolley to move.

In an embodiment, the friction driving mechanism includes a limiting member provided between the driving side swing arm and the driven side swing arm, the driving side swing arm and the driven side swing arm are in contact with the limiting member respectively to form a predetermined distance between the driving wheel and the driven wheel, to facilitate the friction rod to enter between the driving wheel and the driven wheel.

In an embodiment, the driving side swing arm is provided with a first limiting block, and the driven side swing arm is provided with a second limiting block, the first limiting block and the second limiting block being configured to contact and limit the wom limiting member, after the limiting member is worn; and when the driving side swing arm and the driven side swing arm are in normal contact with the limiting member respectively, there is a gap between the first limiting block and the limiting member, and there is a gap between the second limiting block and the limiting member.

In an embodiment, the friction driving mechanism includes a threaded member, the threaded member being threaded connected to the driving side swing arm, and the threaded member being screwed and adjusted to abut against the driven side swing arm and expand the driving side swing arm and the driven side swing arm outwards.

In an embodiment, the lifting device includes a lifting mechanism, a pallet, and a counterweight assembly, the counterweight assembly including a counterweight box, the lifting mechanism including a chain and a fourth driving assembly configured to drive the chain to move up and down, one side of the chain being fixedly connected to the pallet to drive the pallet to move up and down, the other side of the chain being fixedly connected to the counterweight box, the pallet being provided with a second guide rail assembly, and the trolley is slidably connected to the second guide rail assembly.

In an embodiment, the multi-layer conveying system includes a butting positioning assembly, the butting positioning assembly being configured to butt the pallet and the working assembly, the butting positioning assembly including a first guide seat, a second guide seat, a pin, and a fifth driving member, the first guide seat and the second guide seat being each provided with a roller set, the roller set including a plurality of rollers spaced up and down and provided with insertion gaps, the pin being in insertion fit with the insertion gaps, one of the first guide seat and the second guide seat being provided on the pallet, and the other of the first guide seat and the second guide seat being provided on the working assembly, and the fifth driving member being configured to drive the pin to extend through the first guide seat and the second guide seat, such that the second guide rail assembly on the pallet butts the first guide rail assembly on the working assembly.

In an embodiment, the lifting devices each include a chassis and a security assembly, the security assembly including a stop pin, an insertion socket, and a sixth driving member, the insertion socket being fixedly provided on the chassis, the insertion socket being provided with a plurality of insertion holes provided along a vertical direction, the sixth driving member being configured to drive the stop pin to insert, such that the stop pin is in insertion fit with one of the insertion holes, and the pallet is fixedly connected to a carriage, and the sixth driving member being mounted on the carriage.

In an embodiment, the lifting device includes a lifting guide assembly, and the pallet is fixedly connected to a carriage, the lifting guide assembly including a lifting guide rail, a mounting base, a first guide wheel, and two second guide wheels, the mounting base being fixedly connected to the carriage, and the first guide wheel and the second guide wheels being rotatably mounted on the mounting base, wherein the two second guide wheels are in sliding fit with two sides of the lifting guide rail to position the pallet in the horizontal direction; and the first guide wheel is in sliding fit with one side of the lifting guide rail, and the first guide wheel is configured to be in contact with a stroke stopper on the lifting guide rail to limit the pallet in the vertical direction.

In an embodiment, the working assembly includes at least one connecting assembly, and a plurality of working stations are provided, the connecting assembly being configured to connect adjacent two working stations to adjust a distance between the adjacent two working stations.

BRIEF DESCRIPTION OF THE DRAWINGS

The present disclosure is further described below with reference to the accompanying drawings and embodiments.

Reference signs: working assembly 10, working station 100, first guide rail assembly 110, first driving assembly 120, friction driving mechanism 121, driving wheel 1211, driven wheel 1212, driving side swing arm 1213, driven side swing arm 1214, base 1215, elastic member 1216, first driving member 1217, motor base 1218, limiting seat 1219, third limiting block 1220, fourth limiting block 1221, first limiting block 1222, second limiting block 1223, threaded member 1224, guide rod 1225, adjustment rod 1226, friction rod 122, frame assembly 130, vertical direction positioning assembly 140, first positioning wheel 141, first positioning block 142, lateral positioning assembly 150, second positioning wheel 151, second positioning block 152, conveying direction positioning assembly 160, first positioning member 161, clamping component 162, stopper 1621, pressing block 1622, bracket 1623, first connecting rod 1624, second connecting rod 1625, second driving member 1626, third driving member 1627, connecting assembly 200, connecting seat 210, third guide rail assembly 220, lifting device 30, pallet 310, second guide rail assembly 311, counterweight box 320, chain 330, fourth driving member 341, universal coupling 342, sprocket 343, carriage 350, butting positioning assembly 360, first guide seat 361, second guide seat 362, pin 363, fifth driving member 364, roller set 365, security assembly 370, stop pin 371, insertion socket 372, insertion hole 3721, sixth driving member 373, pin board 374, chassis 380, lifting guide assembly 390, lifting guide rail 391, mounting base 392, first guide wheel 393, second guide wheel 394, trolley 40, walking wheel 41.

DETAILED DESCRIPTION OF THE EMBODIMENTS

Specific embodiments of the present disclosure will be described in detail in this section. Preferred embodiments of the present disclosure are shown in the accompanying drawings whose function is to supplement the literal description of the specification with graphics, such that each technical feature and the overall technical solution of the present disclosure can be intuitively and vividly understood, but cannot be construed as limiting the protection scope of the present disclosure.

In the description of the present disclosure, it should be understood that orientation descriptions involved, for example, orientation or position relationships indicated by up, down, front, back, left, right, and so on, are based on the orientation or position relationships shown in the accompanying drawings, and are intended only to facilitate the description of the present disclosure and simplify the description, rather than indicating or implying that the device or element referred to must have a specific orientation and be constructed and operated in a specific orientation, and thus cannot be understood as limiting the present disclosure.

In the description of the present disclosure, "several" means one or more, and "a plurality of" means two or more, "greater than, less than, more than, etc.," are understood as not including the number itself, while "above, below, within, etc.," are understood as including the number itself. If the words of first and second are described, they are only for the purpose of distinguishing technical features, and should not be understood as indicating or implying relative importance or implicitly indicating the number of the indicated technical features or implicitly indicating the order of the indicated technical features.

In the description of the present disclosure, unless otherwise clearly defined, the terms such as "arrange", "mount", and "connect" shall be understood in a broad sense. Those skilled in the art can reasonably determine the specific meanings of the above terms in the present disclosure in combination with specific contents of the technical solution.

Referring to FIG. 1 to FIG. 14, a multi-layer conveying system is provided, including a trolley 40, two lifting devices 30, and two layers of working assembly 10. The working assembly 10 includes at least one working station 100. The working station 100 includes a first guide rail assembly 110 and a first driving assembly 120. The trolley 40 is slidably connected to the first guide rail assembly 110. The first driving assembly 120 is configured to drive the trolley 40 to move along the first guide rail assembly 110 for conveying. Each of the lifting devices 30 is provided at an end of the working assembly 10. The lifting devices 30 are configured to lift or lower the trolley 40, such that the trolley 40 moves up and down between the two layers of working assembly 10. The working station 100 further includes a lateral positioning assembly 150, a vertical direction positioning assembly 140, and a conveying direction positioning assembly 160 that are provided at predetermined positions on a conveying path of the trolley 40. The lateral positioning assembly 150 is configured to contact and position the trolley 40 from both sides thereof. The vertical direction positioning assembly 140 is configured to contact and position the trolley 40 in a vertical direction thereof. The conveying direction positioning assembly 160 is configured to selectively block the trolley 40 from moving.

Figure 1:
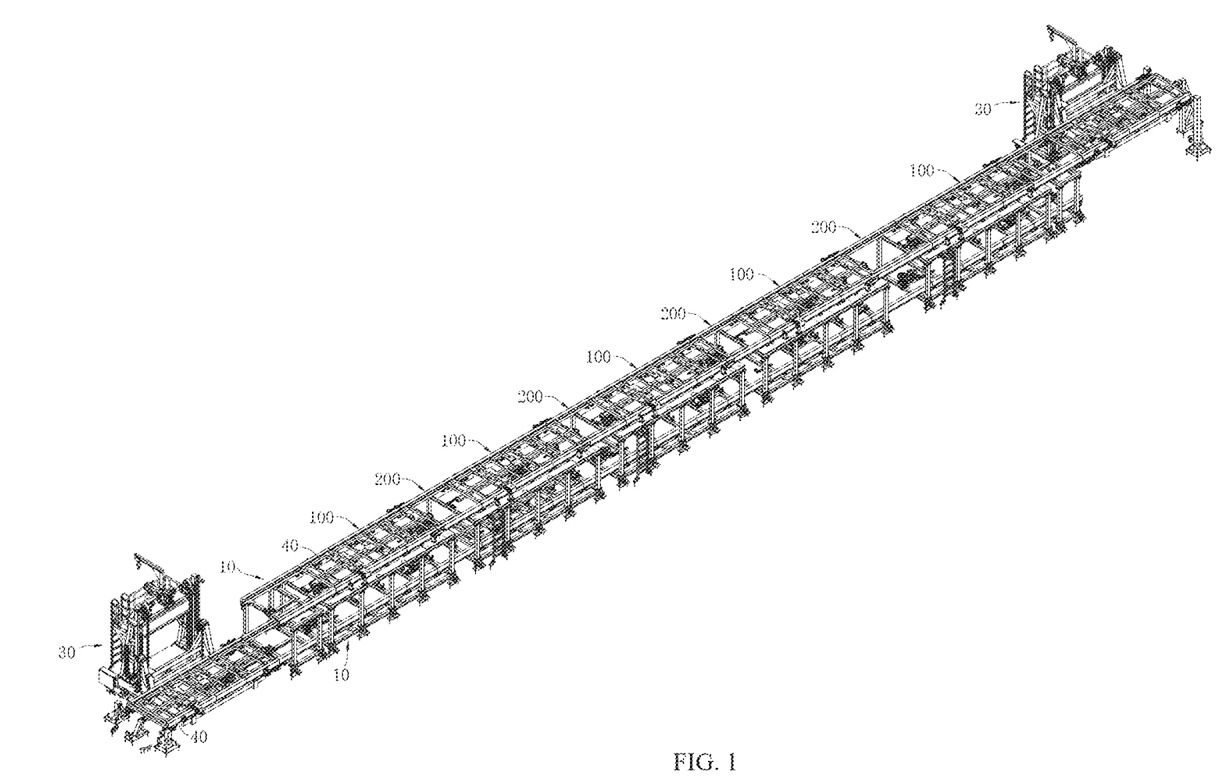
FIG. 1 is a schematic view of an overall structure of a multi-layer conveying system according to an embodiment of the present disclosure.

In the multi-layer conveying system of this embodiment, the trolley 40 is lifted and conveyed by the lifting devices 30, such that the trolley 40 corresponds to a position of the working assembly 10 in one layer. The first driving assembly 120 drives the trolley 40 to move in a horizontal direction. Workpieces are conveyed by the trolley 40, and a welding operation is performed on the working station 100. The trolley 40 is roughly guided by the first guide rail assembly 110. As such, accuracy requirements of the entire system can be reduced, and low-cost and high-speed conveying can be achieved. By the lateral positioning assembly 150, the vertical direction positioning assembly 140, and the conveying direction positioning assembly 160, the trolley 40 is accurately positioned at a predetermined position in which positioning is required. Two sides of the trolley 40, the height position of the trolley in the vertical direction, and the position of the trolley in a conveying direction are respectively positioned, such that the trolley 40 accurately stops at the predetermined position.

In this embodiment, the first guide rail assembly 110 includes two first guide rails spaced apart and arranged in parallel. The first guide rails are horizontal guide rails, which provide a platform for the trolley 40 to slide and roughly guide the trolley 40. The trolley 40 may be conveyed at a high speed along the first guide rail assembly 110. Two sides of the trolley 40 are provided with a plurality of walking wheels 41 slidably connected to the first guide rail assembly 110.

It should be understood that two or more layers of the working assembly 10 may be provided as required. For the two layers of the working assembly 10 in this embodiment, an upper layer conveys a workpiece and machines the workpiece, and a lower layer is configured to return the trolley 40. The multi-layer conveying system in this embodiment may be configured to convey the welding operation, but is not limited hereto, and may also be configured for an assembly operation and other operations.

In this embodiment, the working assembly 10 includes at least one connecting assembly 200. A plurality of working stations 100 are provided. The connecting assembly 200 is configured to connect adjacent two working stations 100 to adjust a distance between the two adjacent working stations 100.

Figure 2:
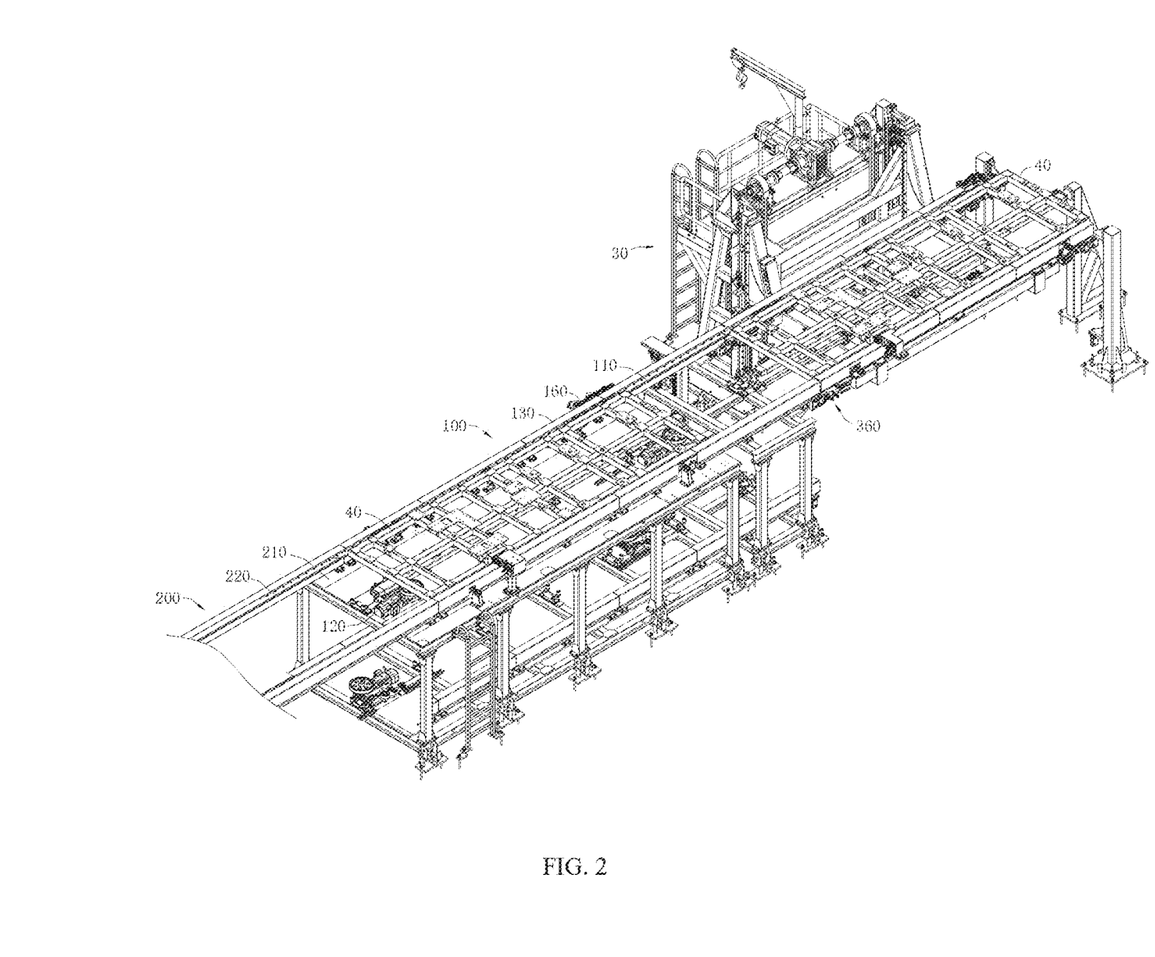
FIG. 2 is a schematic view of a partial structure of the multi-layer conveying system according to an embodiment of the present disclosure.

Referring to FIG. 2, specifically, the working station 100 includes a frame assembly 130. The frame assembly 130 includes a frame, and the first guide rail assembly 110 is mounted on the frame assembly 130. The connecting assembly 200 includes a connecting seat 210 and a third guide rail assembly 220. The third guide rail assembly 220 is mounted on the connecting seat 210, the connecting seat 210 is connected to the frame assemblies 130 on two sides. The third guide rail assembly 220 butts the first guide rail assembly 110, and the third guide rail assembly 220 includes two third guide rails spaced apart and arranged in parallel.

Figure 3:
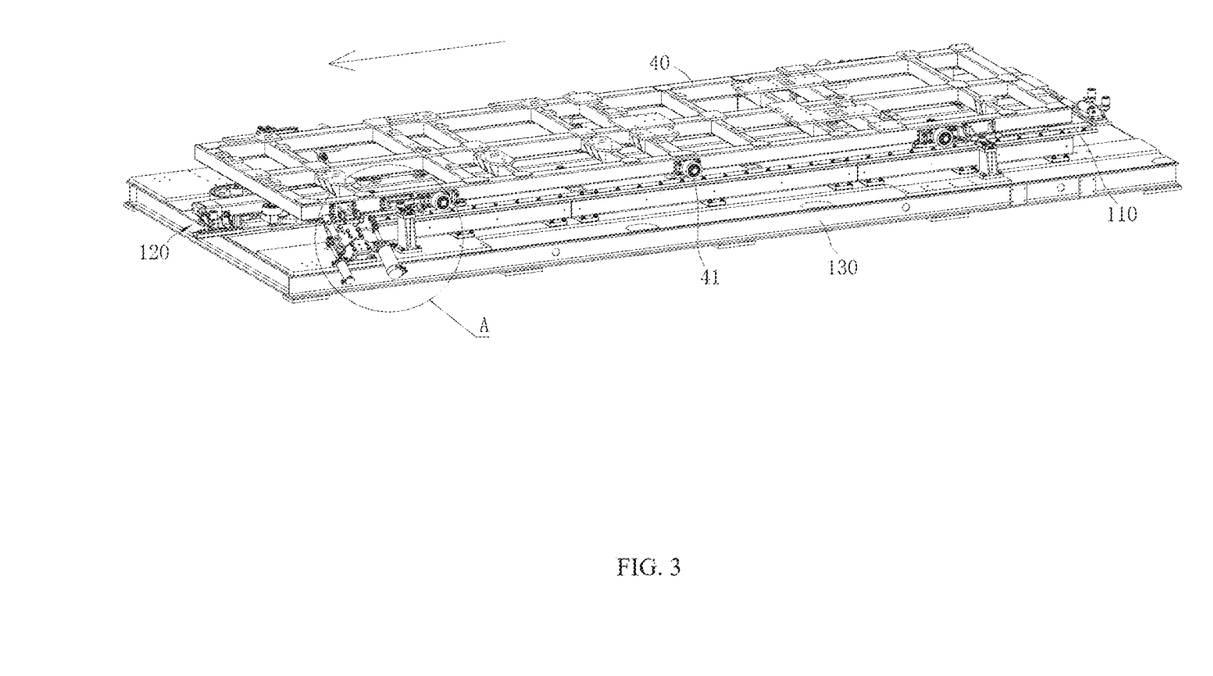
FIG. 3 is a schematic view of positioning a trolley on a working station according to an embodiment of the present disclosure.
Figure 4:
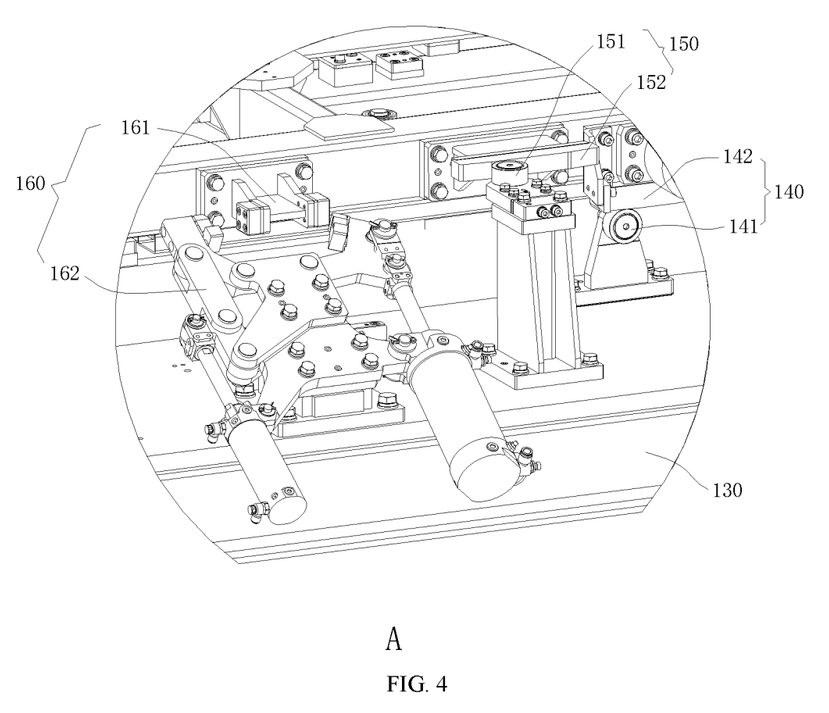
FIG. 4 is an enlarged view of portion A in FIG. 3.

Referring to FIG. 3 and FIG. 4, in some embodiments, the vertical direction positioning assembly 140 includes a first positioning wheel 141 and a first positioning block 142. The first positioning block 142 is provided at a bottom of the trolley 40. The first positioning wheel 141 is provided at a predetermined position on a conveying path of the trolley 40 on the frame assembly 130. As the trolley 40 moves and conveys, at the predetermined position, the first positioning wheel 141 and the first positioning block 142 are in contact fit such that the trolley 40 climbs to a predetermined height, thereby achieving vertical positioning of the trolley 40.

It may be understood that, as an alternative, the first positioning wheel 141 may be provided at the bottom of the trolley 40, and the first positioning block 142 is provided at the predetermined position on the conveying path of the trolley 40 on the frame assembly 130, which can also achieving vertical positioning of the trolley 40.

In some embodiments, the lateral positioning assembly 150 includes a second positioning wheel 151 and a second positioning block 152. The second positioning block 152 is provided on a side face of the trolley 40. The second positioning wheel 151 is provided at a predetermined position on the conveying path of the trolley 40 on the frame assembly 130. As the trolley 40 moves and conveys, at the predetermined position, the second positioning wheel 151 and the second positioning block 152 are in contact fit, thereby correcting a lateral position of the trolley 40 and achieving lateral positioning of the trolley 40.

It should be understood that, as an alternative, the second positioning wheel 151 may be provided on the side face of the trolley 40, and the second positioning block 152 is provided at the predetermined position on the conveying path of the trolley 40 on the frame assembly 130, which can also achieve lateral positioning of the trolley 40.

Figure 5:
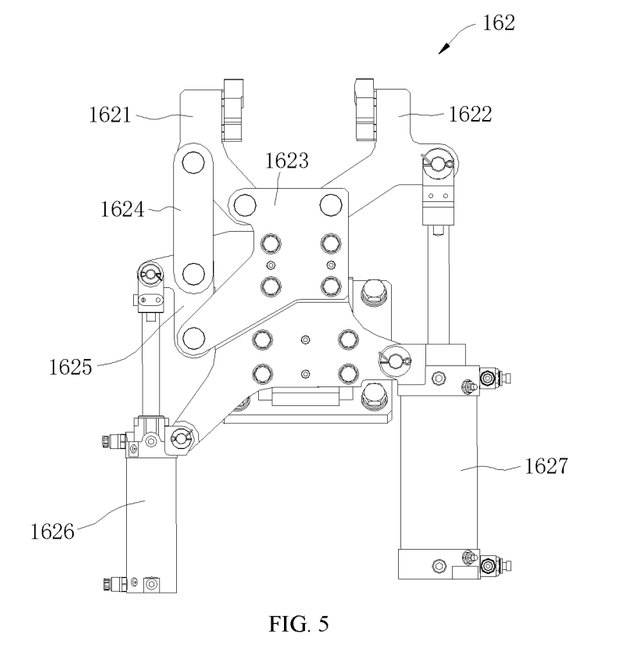
FIG. 5 is a schematic view of a clamping component according to an embodiment of the present disclosure.
Figure 6:
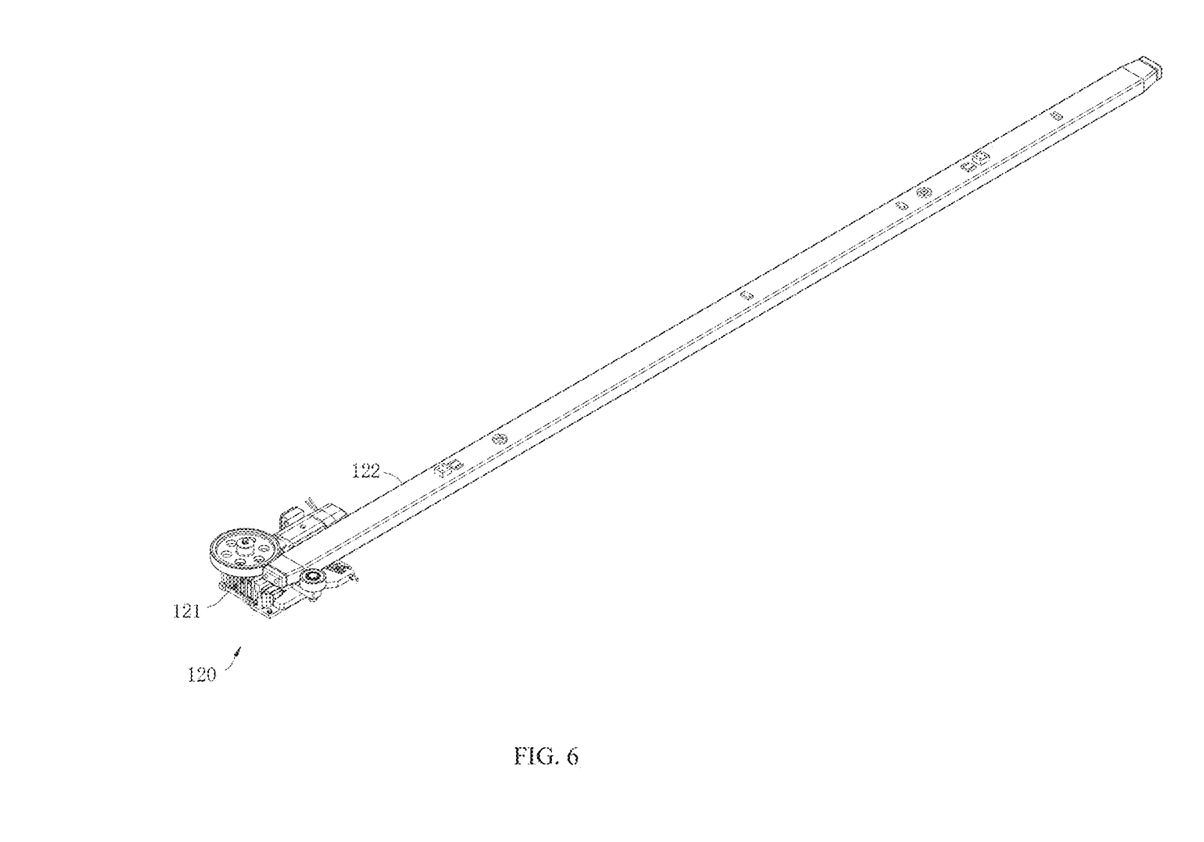
FIG. 6 is a schematic view of a first driving assembly according to an embodiment of the present disclosure.
Figure 7:
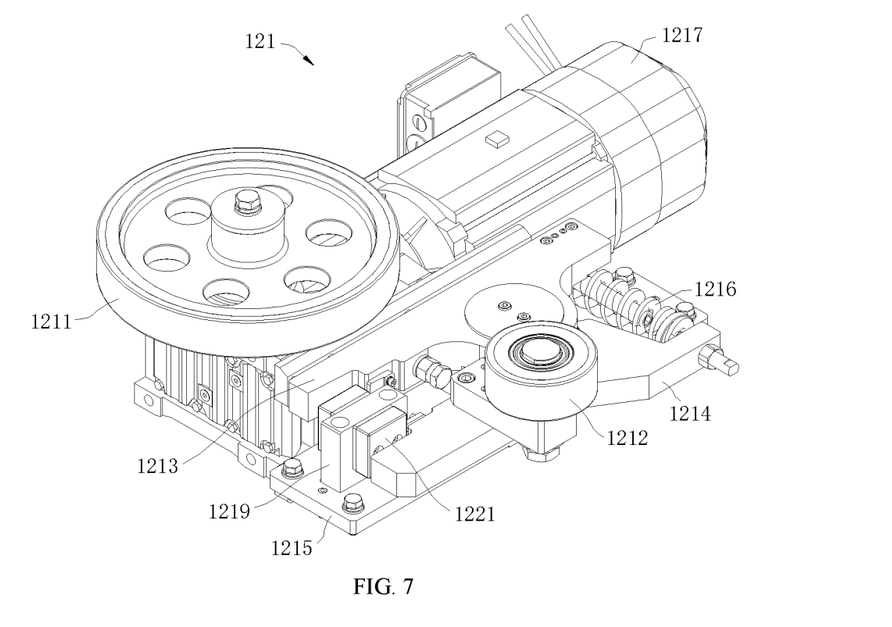
FIG. 7 is a schematic view of a friction driving mechanism according to an embodiment of the present disclosure.
Figure 8:
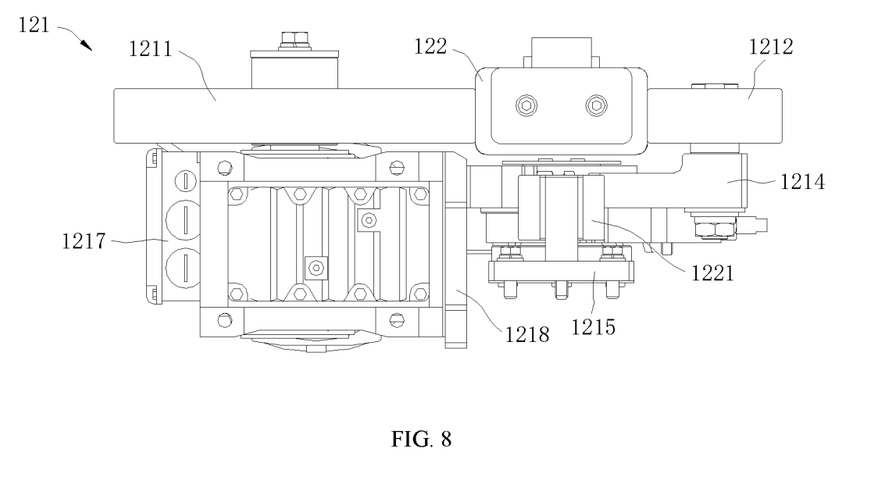
FIG. 8 is a front view of the friction driving mechanism according to an embodiment of the present disclosure.
Figure 9:
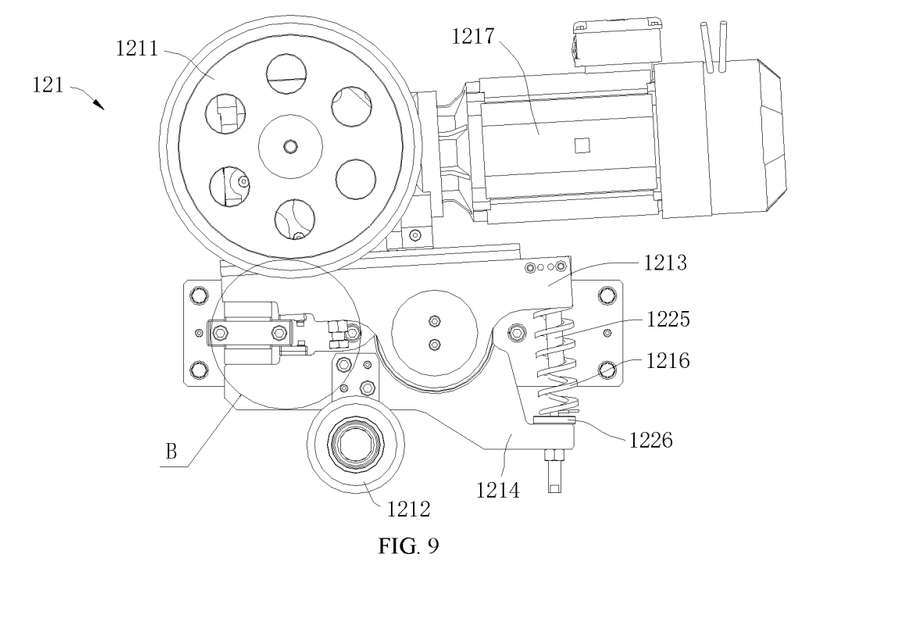
FIG. 9 is a top view of the friction driving mechanism according to an embodiment of the present disclosure.

Referring to FIG. 5, in some embodiments, the conveying direction positioning assembly 160 includes a first positioning member 161 and a clamping component 162. The first positioning member 161 is provided on the trolley 40, the clamping component 162 is provided at a predetermined position on the conveying path of the trolley 40 on the frame assembly 130. The clamping component 162 includes a stopper 1621 and a pressing block 1622 capable of clamping relative to each other. The stopper 1621 is configured to block the first positioning member 161, and the pressing block 1622 is configured to compress the first positioning member 161, such that the first positioning member 161 is in contact with and attached to the stopper 1621. Two sides of the first positioning member 161 have square positioning portions that are in contact with the stopper 1621 and the pressing block 1622, respectively. Positioning in the conveying direction is performed by clamping of the stopper 1621 and the pressing block 1622. The first driving assembly 120 and the clamping component 162 cooperatively provide power to enable the trolley 40 to climb to a predetermined height, and to vertically position the trolley 40, which solves the problem that the trolley 40 cannot reach the predetermined position due to an insufficient climbing force.

In some embodiments, the clamping component 162 further includes a bracket 1623 and a second driving assembly. The stopper 1621 and the pressing block 1622 are rotatably connected to the bracket 1623, respectively. The second driving assembly includes a first connecting rod 1624, a second connecting rod 1625, and a second driving member 1626. The first connecting rod 1624 is rotatably connected to the stopper 1621, one end of the second connecting rod 1625 is rotatably connected to the first connecting rod 1624, and the other end of the second connecting rod 1625 is rotatably connected to the bracket 1623. The second driving member 1626 is configured to drive the second connecting rod 1625 to rotate, and the first connecting rod 1624 and the second connecting rod 1625 have a first position state on the same straight line. In the first position state, and the stopper 1621 contacts and blocks the first positioning member 161.

Specifically, the second driving member 1626 is a cylinder. A piston rod of the second driving member 1626 is rotatably connected to the second connecting rod 1625, and a cylinder block of the second driving member 1626 is rotatably connected to the bracket 1623. In the first position state, the first connecting rod 1624 and the second connecting rod 1625 are on the same straight line. In this case, if the stopper 1621 is impacted during clamping and positioning, the cylinder may not be affected by an axial impact force, thereby protecting the cylinder.

The clamping component 162 further includes a third driving member 1627 configured to drive the pressing block 1622 to rotate. The third driving member 1627 is a cylinder, a piston rod of the third driving member 1627 is rotatably connected to the pressing block 1622, and a cylinder block of the third driving member 1627 is rotatably connected to the bracket 1623. When the trolley 40 is about to reach the predetermined position, the third driving member 1627 drives the pressing block 1622 to perform a clamping action, such that the first positioning member 161 is in close contact with the stopper 1621 to achieve the positioning of the trolley 40 in the conveying direction.

It should be understood that the second driving member 1626 and the third driving member 1627 may alternatively be linear transmission mechanisms or devices such as hydraulic cylinders or electric push rods, which are not limited herein.

It should be understood that a plurality of lateral positioning assemblies 150, a plurality of vertical direction positioning assemblies 140 and a plurality of conveying direction positioning assemblies 160 may be provided as required, so as to position the trolley 40 at a plurality of predetermined positions on the conveying path.

Referring to FIG. 6 to FIG. 10, in some embodiments, the first driving assembly 120 includes a friction driving mechanism 121 and a friction rod 122. The friction rod 122 is fixedly connected to the trolley 40, and the friction driving mechanism 121 is mounted on the frame assembly 130. The friction driving mechanism 121 includes a driving wheel 1211, a driven wheel 1212, a driving side swing arm 1213, a driven side swing arm 1214, and a base 1215. The driving side swing arm 1213 and the driven side swing arm 1214 are respectively connected to the base 1215 on the same axis and may rotate around the same hinge point. The driving wheel 1211 is rotatably provided on the driving side swing arm 1213, and the driven wheel 1212 is rotatably provided on the driven side swing arm 1214. The driving wheel 1211 and the driven wheel 1212 can clamp the friction rod 122 to form contact friction. An elastic member 1216 is provided between the driving side swing arm 1213 and the driven side swing arm 1214. The elastic member 1216 is configured to provide a pre-tightening force for the driving wheel 1211 and the driven wheel 1212 to clamp the friction rod 122. Rotation of the driving wheel 1211 is capable of driving the friction rod 122 and the trolley 40 to move. The elastic member 1216 provides a clamping force to keep the driving wheel 1211 and the driven wheel 1212 in contact with the friction rod 122, thereby increasing a frictional force and preventing slipping.

Specifically, the elastic member 1216 is a spring, and a compression length of the spring is adjustable. A guide rod 1225 and an adjustment rod 1226 are mounted between the driving side swing arm 1213 and the driven side swing arm 1214. The guide rod 1225 is mounted on the driving side swing arm 1213. The elastic member 1216 extends through the guide rod 1225 to guide expansion and contraction of the elastic member 1216, prevent twisting of the elastic member 1216, and ensure accuracy of a direction of a pressing force. The adjustment rod 1226 is in a threaded connection with the driven side swing arm 1214. One end of the spring abuts against an end face of the adjustment rod 1226. By twisting and adjusting an axial position of the adjustment rod 1226, the compression length of the elastic member 1216 can be adjusted, thereby adjusting the pre-tightening force of the friction rod 122 clamped by the driving wheel 1211 and the driven wheel 1212.

Specifically, the friction driving mechanism 121 further includes a first driving member 1217 and a motor base 1218. The first driving member 1217 is a motor. The motor base 1218 is mounted on the driving side swing arm 1213. The first driving member 1217 is mounted on the motor base 1218. The driving wheel 1211 is mounted on an output shaft of the first driving member 1217 and fits an end face of the first driving member 1217, so as to minimize a force arm of the friction rod 122 acting on an output shaft of the motor through the driving wheel 1211, thereby minimizing a load on the first driving member 1217. Due to the mounting position of the driving wheel 1211, the first driving member 1217 is mounted sideways. The motor base 1218 is connected to a side face of the first driving member 1217 and mounted on the driving side swing arm 1213. The first driving member 1217 drives the driving wheel 1211 to rotate, thereby driving the friction rod 122 and the trolley 40 to move.

Figure 10:
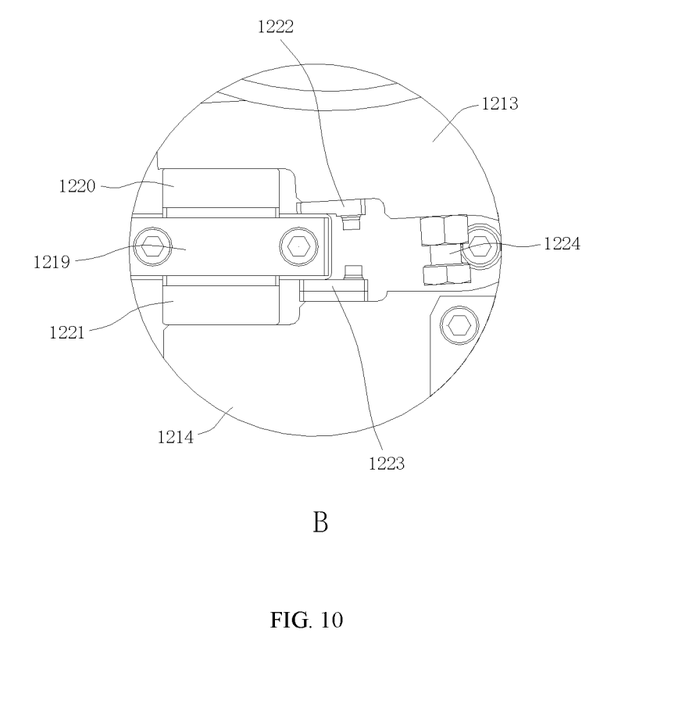
FIG. 10 is an enlarged view of portion B in FIG. 9.

Referring to FIG. 10, in some embodiments, the friction driving mechanism 121 includes a limiting member provided between the driving side swing arm 1213 and the driven side swing arm 1214. The limiting member and the elastic member 1216 are located on two sides of the hinge point, respectively. In an initial state, the driving side swing arm 1213 and the driven side swing arm 1214 are in contact with the limiting member respectively, so as to form a predetermined distance between the driving wheel 1211 and the driven wheel 1212, to facilitate the friction rod 122 to enter between the driving wheel 1211 and the driven wheel 1212. Specifically, the limiting member includes a limiting seat 1219, and a third limiting block 1220 and a fourth limiting block 1221 that are mounted on two sides of the limiting seat 1219. In the initial state, the driving side swing arm 1213 is in contact with the third limiting block 1220, and the driven side swing arm 1214 is in contact with the fourth limiting block 1221. When the friction rod 122 enters between the driving wheel 1211 and the driven wheel 1212, the driving side swing arm 1213 is detached from the third limiting block 1220, and the driven side swing arm 1214 is detached from the fourth limiting block 1221, such that an elastic force of the elastic member 1216 is applied to the friction rod 122. Under a driving action of the first driving member 1217, a frictional force required for conveying of the friction rod 122 is generated.

Further, the driving side swing arm 1213 is provided with a first limiting block 1222, the driven side swing arm 1214 is provided with a second limiting block 1223. The first limiting block 1222 and the second limiting block 1223 are configured to contact and limit the worn limiting member, after the limiting member is worn. In a state when the driving side swing arm 1213 and the driven side swing arm 1214 are in normal contact with the limiting member (the limiting member is not worn) respectively, there is a gap between the first limiting block 1222 and the limiting member, and there is a gap between the second limiting block 1223 and the limiting member.

Since the driving side swing arm 1213 and the driven side swing arm 1214 are in frequent contact with the third limiting block 1220 and the fourth limiting block 1221, the third limiting block 1220 and the fourth limiting block 1221 are easily and excessively worn or damaged. As a result, the distance between the driving wheel 1211 and the driven wheel 1212 becomes too small for the friction rod 122 to enter, or may cause damages to parts due to an excessively great impact when entering. When the driving side swing arm 1213 is in normal contact with the third limiting block 1220, there is a gap between the first limiting block 1222 and the limiting member, and when the driven side swing arm 1214 is in normal contact with the fourth limiting block 1221, there is a gap between the second limiting block 1223 and the limiting member. After the third limiting block 1220 and the fourth limiting block 1221 are damaged or worn to a certain extent, the first limiting block 1222 is in contact with the limiting seat 1219, and the second limiting block 1223 is in contact with the limiting seat 1219. In this case, the distance between the driving wheel 1211 and the driven wheel 1212 is still sufficient for the friction rod 122 to enter, thereby achieving secondary limiting and ensuring stability of conveying.

In some embodiments, the friction driving mechanism 121 includes a threaded member 1224. The threaded member 1224 is in a threaded connection with the driving side swing arm 1213. The threaded member 1224 can be screwed and adjusted to abut against the driven side swing arm 1214 and expand the driving side swing arm 1213 and the driven side swing arm 1214 outwards. When the third limiting block 1220 and the fourth limiting block 1221 are worn and required to be replaced, the driving side swing arm 1213 and the driven side swing arm 1214 are expand outwards by screwing the threaded member 1224, such that neither the third limiting block 1220 nor the fourth limiting block 1221 is stressed, thereby facilitating disassembly, replacement, and mounting of the limiting member.

In order to ensure that the trolley 40 does not lose power during conveying and does not cause a waste of resources, the working station 100 where two friction driving mechanisms 121 are mounted and the working station 100 where one friction driving mechanism 121 is mounted are staggered and distributed to maximize utilization of power resources. For the working station 100 where two friction driving mechanisms 121 are mounted, the two friction driving mechanisms 121 are provided at two ends of the working station 100. For the working station 100 where one friction driving mechanism 121 is mounted, the friction driving mechanism 121 is provided in the middle of the working station 100.

Figure 11:
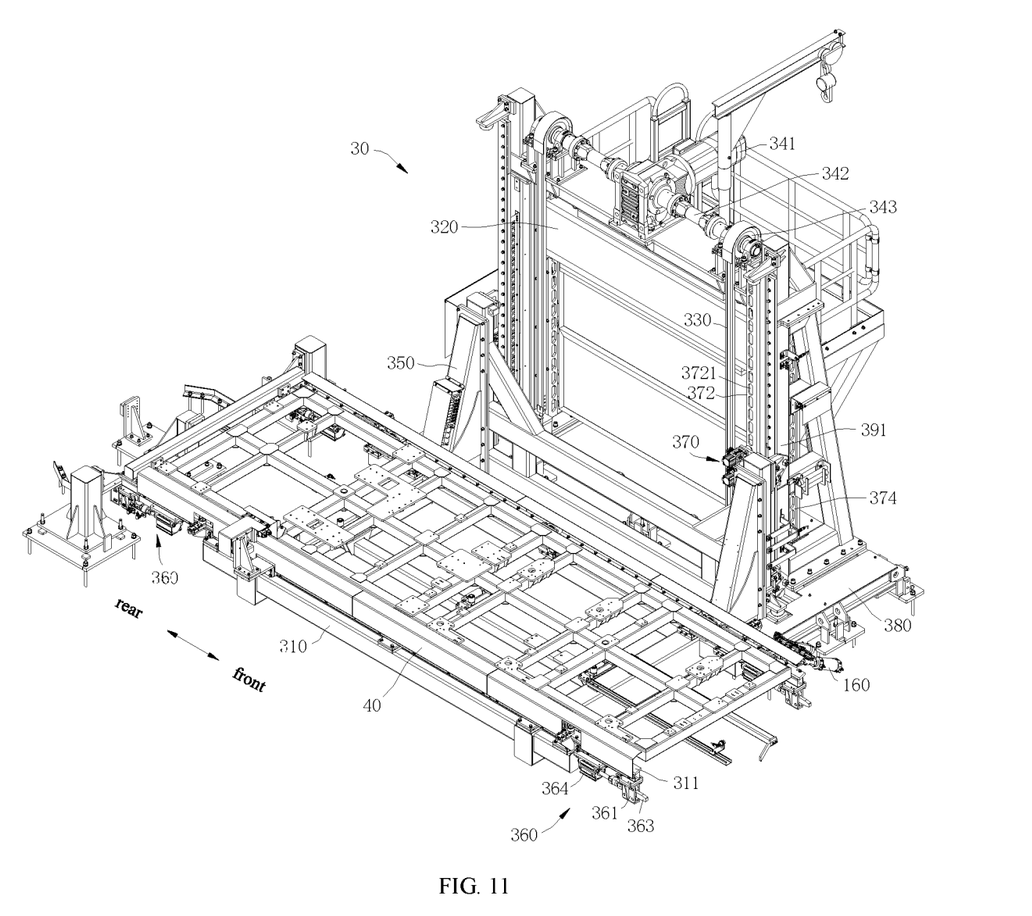
FIG. 11 is a schematic view of a lifting device according to an embodiment of the present disclosure.

Referring to FIG. 11, in some embodiments, the lifting device 30 includes a lifting mechanism, a pallet 310, and a counterweight assembly. The counterweight assembly includes a counterweight box 320, the lifting mechanism includes a chain 330 and a fourth driving assembly configured to drive the chain 330 to move up and down. One side of the chain 330 is fixedly connected to the pallet 310 to drive the pallet 310 to move up and down, the other side of the chain 330 is fixedly connected to the counterweight box 320 to balance a weight of the pallet 310. The pallet 310 is provided with a second guide rail assembly 311, and the trolley 40 is slidably connected to the second guide rail assembly 311. The pallet 310 is configured to carry the trolley 40. The friction driving mechanism 121 may be provided on the pallet 310 to drive the trolley 40 to move into the working assembly 10 in the horizontal direction. The second guide rail assembly 311 includes two second guide rails spaced apart and arranged in parallel.

Specifically, the fourth driving assembly includes a fourth driving member 341, a universal coupling 342, and a sprocket 343. Specifically, the fourth driving member 341 is a motor, and two ends of the universal coupling 342 are connected to an output shaft of the fourth driving member 341 and the sprocket 343, respectively. Power of the fourth driving member 341 is transferred to the sprocket 343 through the universal coupling 342. Rotation of the sprocket 343 drives the chain 330 to move up and down. The use of the universal coupling 342 can ensure accuracy and facilitate assembly.

Figure 12:
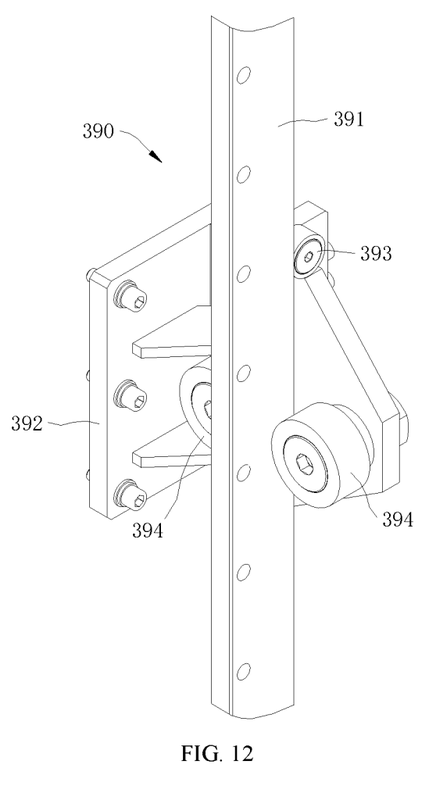
FIG. 12 is a schematic view of a lifting guide assembly according to an embodiment of the present disclosure.

Referring to FIG. 12, in some embodiments, the lifting device 30 includes a lifting guide assembly 390. The pallet 310 is fixedly connected to a carriage 350. The lifting guide assembly 390 includes a lifting guide rail 391, a mounting base 392, a first guide wheel 393, and two second guide wheels 394. The mounting base 392 is fixedly connected to the carriage 350, and the first guide wheel 393 and the second guide wheels 394 are rotatably mounted on the mounting base 392. The two second guide wheels 394 are in sliding fit with two sides of the lifting guide rail 391 to position the pallet 310 in the horizontal direction, such that the position of the pallet 310 in the horizontal direction does not change during the lifting. The first guide wheel 393 is in sliding fit with one side of the lifting guide rail 391 to contact a stroke stopper 1621 on the lifting guide rail 391 to limit the pallet 310 in the vertical direction. The lifting device 30 includes a chassis 380. Two lifting guide rails 391 are provided, and the two lifting guide rails 391 are fixedly provided on the chassis 380 at intervals and in parallel.

Figure 13:
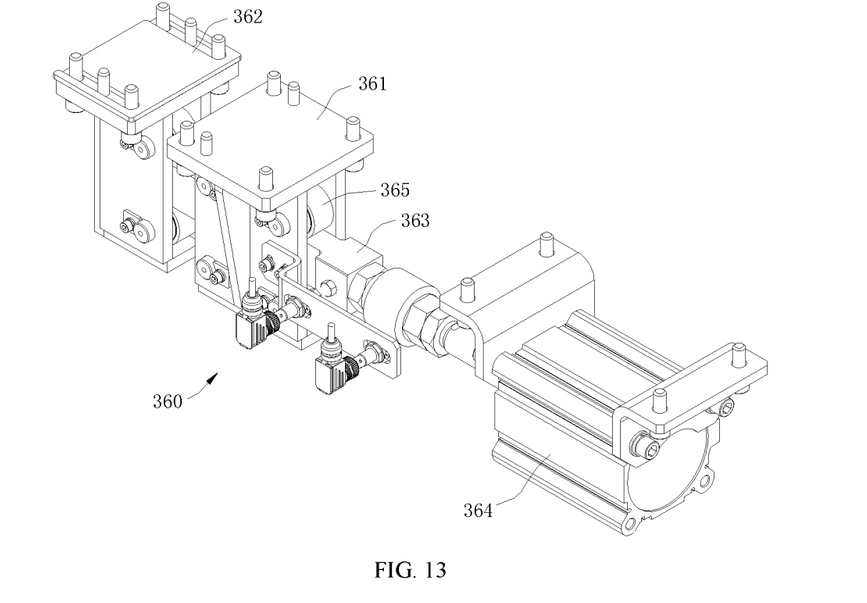
FIG. 13 is a schematic view of a butting positioning assembly according to an embodiment of the present disclosure.

Referring to FIG. 13, in some embodiments, the multi-layer conveying system includes a butting positioning assembly 360 configured to butt the pallet 310 and the working assembly 10. The butting positioning assembly 360 includes a first guide seat 361, a second guide seat 362, a pin 363, and a fifth driving member 364. The first guide seat 361 and the second guide seat 362 are each provided with a roller set 365. The roller set 365 includes a plurality of rollers spaced up and down and provided with insertion gaps. The pin 363 is in insertion fit with the insertion gaps. The first guide seat 361 is fixed below the second guide rail assembly 311 on the pallet 310, and the second guide seat 362 is fixed below the first guide rail assembly 110 on the working assembly 10. The fifth driving member 364 is provided on the same side as the first guide seat 361 and is mounted below the second guide rail assembly 311. Specifically, the fifth driving member 364 is a cylinder. After the lifting mechanism drives the pallet 310 to move up and down to a position corresponding to one layer of the working assembly 10, the fifth driving member 364 drives the pin 363 to extend through the first guide seat 361 and the second guide seat 362, such that the second guide rail assembly 311 on the pallet 310 accurately butts the first guide rail assembly 110 on the working assembly 10, so as to realize the positioning of the pallet 310 and eliminate deformation generated due to a large load, thus enabling the trolley 40 to smoothly move from the pallet 310 up to the working assembly 10, thereby improving accuracy of butting.

Referring to FIG. 11, in this embodiment, four corners of the pallet 310 are each provided with the butting positioning assembly 360. At an end (rear end) of the pallet 310 not butting the working assembly 10, the second guide seat 362 of the butting positioning assembly 360 may be mounted on the ground or on a steel platform in the air, and may support the pallet 310 after butting the first guide seat 361 on the pallet 310 through the pin 363.

It should be understood that, as an alternative, the first guide seat 361 and the fifth driving member 364 may be provided on the working assembly 10. The second guide seat 362 may be provided on the pallet 310, that is, positions of the first guide seat 361 and the second guide seat 362 are interchanged. In this way, the butting between the pallet 310 and the working assembly 10 can also be achieved.

Figure 14:
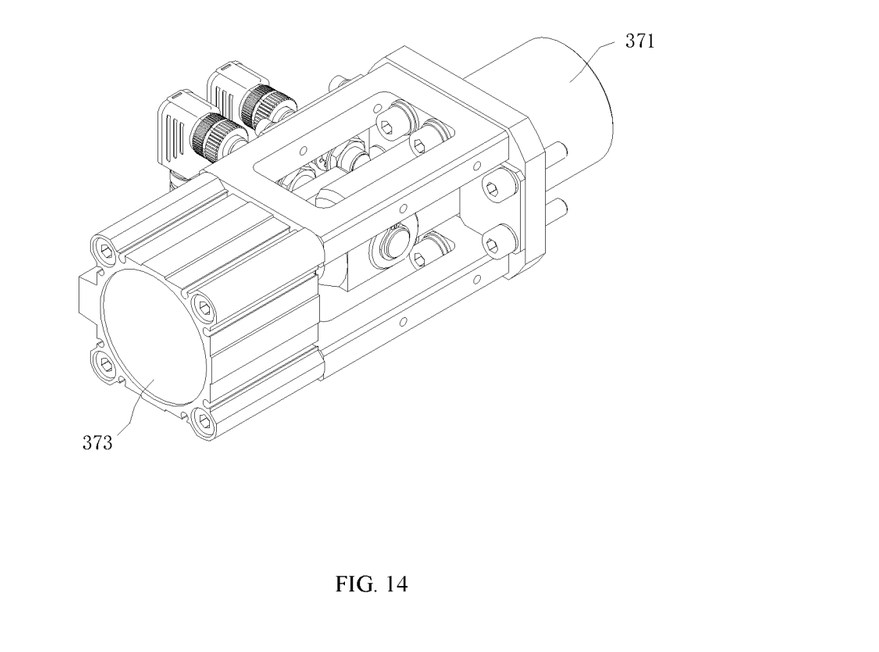
FIG. 14 is a schematic view of a partial structure of a security assembly according to an embodiment of the present disclosure.

Referring to FIG. 11 and FIG. 14, in some embodiments, the lifting device 30 includes a security assembly 370. The security assembly 370 includes a stop pin 371, an insertion socket 372, and a sixth driving member 373. The sixth driving member 373 is specifically a cylinder. The insertion socket 372 is fixedly provided on the chassis 380. The insertion socket 372 is provided with a plurality of insertion holes 3721 arranged along a vertical direction. The sixth driving member 373 may drive an insertion action of the stop pin 371, such that the stop pin 371 is in insertion fit with one of the insertion holes 3721. The sixth driving member 373 is mounted on the carriage 350. Through the insertion fit between the stop pin 371 and the insertion socket 372, the pallet 310 can be braked, so as to ensure that the pallet 310 does not fall and hit the ground in an emergency or accidental situation. Specifically, the insertion hole 3721 is an oblong hole, and the stop pin 371 and the sixth driving member 373 form a set of stop units. In this embodiment, two sets of stop units are provided, and the two sets of stop units are spaced at a certain distance in the vertical direction, so as to ensure that at least one stop pin 371 can be inserted into the insertion hole 3721 of the insertion socket 372 when the pallet 310 is at any height. Through the security assembly 370, security of the lifting action of the lifting device 30 can be improved.

Further, the security assembly 370 further includes a maintenance pin and a pin board 374. The pin board 374 is fixedly provided on the chassis 380, and the pin board 374 is provided with a plurality of oblong holes arranged in the vertical direction. During maintenance, the maintenance pin can be removed and inserted into any matching hole in the counterweight box 320 through the pin board 374, so as to ensure that the counterweight box 320 may not fall to the ground under an unexpected condition and cause an accident.

The conveying direction positioning assembly 160 may be provided on the pallet as required, so as to position the trolley 40.

The embodiments of the present disclosure are described in detail with reference to the accompanying drawings above, but the present disclosure is not limited to the above embodiments, and various changes may also be made within the knowledge scope of those of ordinary skill in the art without departing from the purpose of the present disclosure.

What is claimed is:

1. A multi-layer conveying system, comprising:
   at least two layers of working assembly, the working assembly comprising at least one working station, the working station comprising a first guide rail assembly and a first driving assembly;
   a trolley slidably connected to the first guide rail assembly, the first driving assembly being configured to drive the trolley to move along the first guide rail assembly for conveying; and
   lifting devices, each of the lifting devices being provided at an end of the working assembly, the lifting devices being configured to lift or lower the trolley, such that the trolley moves up and down between the layers of the working assembly;
   wherein the working station further comprises a lateral positioning assembly, a vertical direction positioning assembly, and a conveying direction positioning assembly that are provided at predetermined positions on a conveying path of the trolley, the lateral positioning assembly being configured to contact and position the trolley from both sides thereof, the vertical direction positioning assembly being configured to contact and position the trolley in a vertical direction thereof, and the conveying direction positioning assembly being configured to selectively block the trolley from moving.

2. The multi-layer conveying system according to claim 1, wherein the conveying direction positioning assembly comprises a first positioning member and a clamping component, the first positioning member being provided on the trolley, the clamping component being provided at the predetermined position on the conveying path of the trolley, the clamping component comprising a stopper and a pressing block capable of clamping relative to each other, the stopper being configured to block the first positioning member, and the pressing block being configured to compress the first positioning member, such that the first positioning member is in contact with the stopper.

3. The multi-layer conveying system according to claim 2, wherein the clamping component further comprises a bracket and a second driving assembly, the stopper and the pressing block are rotatably connected to the bracket, respectively, the second driving assembly comprising a first connecting rod, a second connecting rod, and a second driving member, the first connecting rod being rotatably connected to the stopper, one end of the second connecting rod being rotatably connected to the first connecting rod, another end of the second connecting rod being rotatably connected to the bracket, the second driving member being configured to drive the second connecting rod to rotate, the first connecting rod and the second connecting rod having a first position state on the same straight line, and in the first position state, the stopper contacts and blocks the first positioning member.

4. The multi-layer conveying system according to claim 3, wherein the second driving member is a cylinder, a piston rod of the second driving member is rotatably connected to the second connecting rod, a cylinder block of the second driving member is rotatably connected to the bracket, the clamping component further comprises a third driving member configured to drive the pressing block to rotate, the third driving member being a cylinder, a piston rod of the third driving member is rotatably connected to the pressing block, and a cylinder block of the third driving member is rotatably connected to the bracket.

5. The multi-layer conveying system according to claim 1, wherein the vertical direction positioning assembly comprises a first positioning wheel and a first positioning block, one of the first positioning wheel and the first positioning block being provided at a bottom of the trolley, another of the first positioning wheel and the first positioning block being fixedly provided at the predetermined position on the conveying path of the trolley, and at the predetermined position, the first positioning wheel is in contact and cooperates with the first positioning block to enable the trolley to climb to a predetermined height.

6. The multi-layer conveying system according to claim 1, wherein the lateral positioning assembly comprises a second positioning wheel and a second positioning block, one of the second positioning wheel and the second positioning block being provided on a side face of the trolley, another of the second positioning wheel and the second positioning block being fixedly provided at the predetermined position on the conveying path of the trolley, and at the predetermined position, the second positioning wheel is in contact and cooperates with the second positioning block.

7. The multi-layer conveying system according to claim 1, wherein the first driving assembly comprises a friction driving mechanism and a friction rod, the friction rod being fixedly connected to the trolley, the friction driving mechanism comprising a driving wheel, a driven wheel, a driving side swing arm, a driven side swing arm, and a base, the driving side swing arm and the driven side swing arm being respectively and rotatably connected to the base on the same axis, the driving wheel being rotatably provided on the driving side swing arm, the driven wheel being rotatably provided on the driven side swing arm, the driving wheel and the driven wheel clamping the friction rod to form contact friction, an elastic member being provided between the driving side swing arm and the driven side swing arm, the elastic member being configured to provide a pre-tightening force to enable the driving wheel and the driven wheel to clamp the friction rod, and rotation of the driving wheel being capable of driving the friction rod and the trolley to move.

8. The multi-layer conveying system according to claim 7, wherein the friction driving mechanism comprises a limiting member provided between the driving side swing arm and the driven side swing arm, the driving side swing arm and the driven side swing arm are in contact with the limiting member, respectively, so as to form a predetermined distance between the driving wheel and the driven wheel, thus facilitating the friction rod to enter between the driving wheel and the driven wheel.

9. The multi-layer conveying system according to claim 8, wherein the driving side swing arm is provided with a first limiting block, and the driven side swing arm is provided with a second limiting block, the first limiting block and the second limiting block being configured to contact and limit the worn limiting member after the limiting member is worn; when the driving side swing arm and the driven side swing arm are in normal contact with the limiting member respectively, a gap is formed between the first limiting block and the limiting member, and a gap is formed between the second limiting block and the limiting member.

10. The multi-layer conveying system according to claim 8, wherein the friction driving mechanism comprises a threaded member threaded connected to the driving side swing arm, and the threaded member being screwed and adjusted to abut against the driven side swing arm, so as to expand the driving side swing arm and the driven side swing arm outwards.

11. The multi-layer conveying system according to claim 1, wherein the lifting device comprises a lifting mechanism, a pallet, and a counterweight assembly, the counterweight assembly comprising a counterweight box, the lifting mechanism comprising a chain and a fourth driving assembly configured to drive the chain to move up and down, one side of the chain being fixedly connected to the pallet to drive the pallet to move up and down, another side of the chain being fixedly connected to the counterweight box, the pallet being provided with a second guide rail assembly, and the trolley is slidably connected to the second guide rail assembly.

12. The multi-layer conveying system according to claim 11, wherein the multi-layer conveying system comprises a butting positioning assembly, the butting positioning assembly being configured to butt the pallet and the working assembly, the butting positioning assembly comprising a first guide seat, a second guide seat, a pin, and a fifth driving member, the first guide seat and the second guide seat being each provided with a roller set, the roller set comprising a plurality of rollers spaced up and down and provided with insertion gaps, the pin being in insertion fit with the insertion gaps, one of the first guide seat and the second guide seat being provided on the pallet, another of the first guide seat and the second guide seat being provided on the working assembly, and the fifth driving member being configured to drive the pin to extend through the first guide seat and the second guide seat, such that the second guide rail assembly on the pallet butts the first guide rail assembly on the working assembly.

13. The multi-layer conveying system according to claim 11, wherein the lifting device comprises a chassis and a security assembly, the security assembly comprising a stop pin, an insertion socket, and a sixth driving member, the insertion socket being fixedly provided on the chassis, the insertion socket being provided with a plurality of insertion holes arranged along a vertical direction, the sixth driving member being configured to drive the stop pin to insert, such that the stop pin is in insertion fit with one of the insertion holes, the pallet being fixedly connected to a carriage, and the sixth driving member being mounted on the carriage.

14. The multi-layer conveying system according to claim 11, wherein the lifting device comprises a lifting guide assembly, and the pallet being fixedly connected to a carriage, the lifting guide assembly comprising a lifting guide rail, a mounting base, a first guide wheel, and two second guide wheels, the mounting base being fixedly connected to the carriage, and the first guide wheel and the second guide wheels being rotatably mounted on the mounting base, wherein the two second guide wheels are in sliding fit with two sides of the lifting guide rail to position the pallet in a horizontal direction, and the first guide wheel is in sliding fit with one side of the lifting guide rail, and the first guide wheel is configured to be in contact with a stroke stopper on the lifting guide rail to limit the pallet in the vertical direction.

15. The multi-layer conveying system according to claim 1, wherein the working assembly comprises at least one connecting assembly, a plurality of working stations being provided, and the connecting assembly being configured to connect adjacent two working stations to adjust a distance between the adjacent two working stations.

* * * * *